United States Patent
Nakano et al.

(10) Patent No.: US 9,291,216 B2
(45) Date of Patent: Mar. 22, 2016

(54) ELECTROMAGNETIC CLUTCH

(75) Inventors: Ryutaro Nakano, Tokyo (JP);
Nobuyuki Sekikawa, Tokyo (JP);
Hiromi Okubayashi, Tokyo (JP)

(73) Assignee: SINFONIA TECHNOLOGY CO., LTD., Tokyo (JP)

(*) Notice: Subject to any disclaimer, the term of this patent is extended or adjusted under 35 U.S.C. 154(b) by 133 days.

(21) Appl. No.: 14/008,382

(22) PCT Filed: Apr. 2, 2012

(86) PCT No.: PCT/JP2012/058804
§ 371 (c)(1),
(2), (4) Date: Sep. 27, 2013

(87) PCT Pub. No.: WO2012/133883
PCT Pub. Date: Oct. 4, 2012

(65) Prior Publication Data
US 2014/0021003 A1    Jan. 23, 2014

(30) Foreign Application Priority Data

Mar. 31, 2011  (JP) ................. 2011-080465

(51) Int. Cl.
*F16D 27/14* (2006.01)
*F16D 27/112* (2006.01)
*F16D 27/00* (2006.01)
*F16D 27/06* (2006.01)

(52) U.S. Cl.
CPC .............. *F16D 27/14* (2013.01); *F16D 27/112* (2013.01); *F16D 27/06* (2013.01); *F16D 2027/008* (2013.01)

(58) Field of Classification Search
USPC ........................................ 192/84.96, 84.961
See application file for complete search history.

(56) References Cited

U.S. PATENT DOCUMENTS 5,762,173 A * 6/1998 Nishimura ............... 192/84.961
6,419,066 B1 * 7/2002 Kittaka et al. ........... 192/84.961

FOREIGN PATENT DOCUMENTS

| JP | 54-88616 U | 6/1979 |
|---|---|---|
| JP | 07-286631 A | 10/1995 |
| JP | 10-148223 A | 6/1998 |
| JP | 11-082551 A | 3/1999 |
| JP | 2003-004067 A | 1/2003 |
| JP | 2008-116012 A | 5/2008 |
| JP | 2009-047250 A | 3/2009 |
| JP | 2009-121600 A | 6/2009 |

OTHER PUBLICATIONS

International Search Report for PCT/JP2012/058804, Mailing Date of May 29, 2012.

* cited by examiner

*Primary Examiner* — Colby M Hansen
(74) *Attorney, Agent, or Firm* — Westerman, Hattori, Daniels & Adrian, LLP

(57) ABSTRACT

The electromagnetic clutch (X) includes a rotating shaft (1): a magnetic pole body (2) and a rotor (3) disposed to face each other along an axial direction of the rotating shaft (1); and an armature (4) capable of moving in a direction attachable to or detachable from the rotor (3) along the axial direction of the rotating shaft and forming a magnetic circuit with the magnetic pole body and the rotor. The armature is moved in the axial direction of the rotating shaft by electromagnetic suction force to press the rotor when an exciting coil (21) is in an excitation state. The rotating shaft is configured by an input side shaft portion (11) which is a non-magnetic body and formed of a material having enough strength to support rotation of the rotor and the armature; and an output side shaft portion (12) which is a magnetic body.

4 Claims, 1 Drawing Sheet

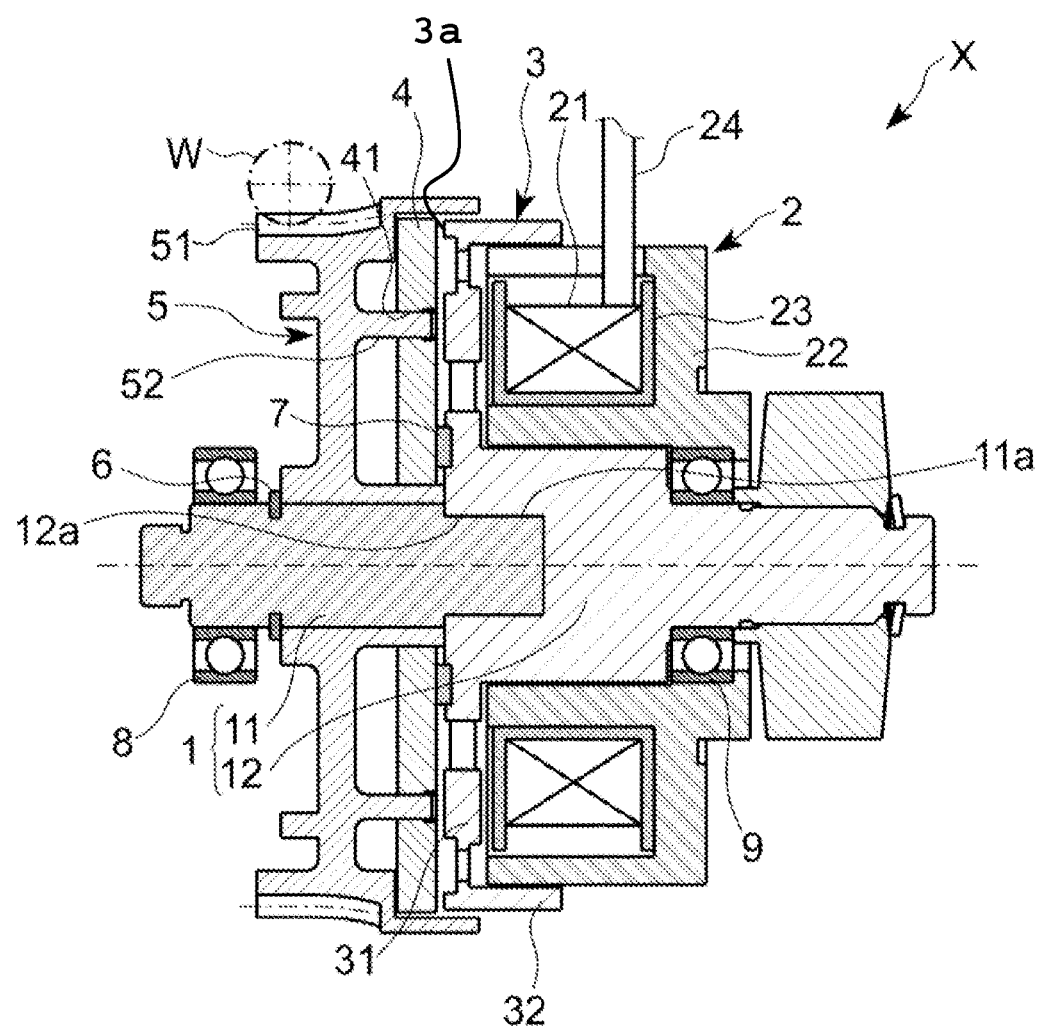

ELECTROMAGNETIC CLUTCH

TECHNICAL FIELD

The present invention relates to an electromagnetic clutch.

BACKGROUND ART

Traditionally, there is a known electromagnetic clutch including a pole body having an exciting coil, a rotor that is located at a position facing the pole body and is integrally rotatable with a rotating shaft, and an armature slidable in the axial direction of the rotating shaft, wherein when the exciting coil is in an excited state, the armature is pressed against the rotor by a magnetic attraction force to transmit a rotating torque (see Patent Literature 1).

CITATION LIST

Patent Literature

Patent Literature 1: Japanese Patent Laid-Open No. 2009-047250

SUMMARY OF INVENTION

Technical Problem

In such a conventional electromagnetic friction clutch, the rotating shaft is formed of a non-magnetic material, such as stainless steel. This is because any rotating shaft formed of a material with magnetism may disadvantageously have an adverse effect (occurrence of erroneous operation or erroneous detection) when the number of revolutions of the rotating shaft is to be detected by a sensor (such as a magnetic sensor) provided at a predetermined location on the input side. In addition to being of a non-magnetic material, the rotating shaft is typically made of stainless steel in order to satisfy a requirement of reliably transmitting a torque from the input side to the output side.

Non-magnetic high-strength stainless steel, however, is expensive, and it has been considered that such a rotating shaft made of stainless steel used in an electromagnetic clutch has been a cause of an increased cost of the entire electromagnetic clutch.

Thus, the inventor has reviewed the functionality of a rotating shaft, and obtained the following findings: depending on types or specifications of an electromagnetic clutch, although the input side of the rotating shaft needs to be non-magnetic, there is no special reason for the output side to be non-magnetic when the positional relationship with the sensor is considered; in view of torque transmission, it is sufficient to transmit rotation from the input side to the output side of the rotating shaft; and in consideration of these findings, the entire rotating shaft need not be made of stainless steel as long as the respective requirements of the input and output sides are satisfied.

The primary object of the invention, which has been made in view of the above considerations, is to provide an electromagnetic clutch including a rotating shaft having a different structure from that of a conventional rotating shaft, which enables cost reduction while being capable of reliably transmitting a torque from the input side to the output side.

Solution to Problem

The present invention relates to an electromagnetic clutch including a rotating shaft, a pole body having an exciting coil, a rotor located at a position facing the pole body along an axial direction of the rotating shaft, and an armature movable in the axial direction of the rotating shaft in a direction in which the armature alternately touches and releases the rotor, the armature being capable of forming a magnetic circuit along with the pole body and the rotor, wherein when the exciting coil is in an excited state, the armature is moved in the axial direction of the rotating shaft by an electromagnetic attraction force so as to be pressed against the rotor. The term "press against" as used herein refers to urging and pressing an object while being in contact with the object.

Further, the electromagnetic clutch according to the invention is characterized in that the rotating shaft includes an input side shaft portion consisting of a material that is non-magnetic and has a sufficient strength for supporting rotation of the rotor and the armature, and an output side shaft portion engaged with the input side shaft portion in such a manner that the shaft portions cannot be rotated relative to each other and consisting of a material different from that of the input side shaft portion.

According to such an electromagnetic clutch, which adopts a novel technical idea of dividing the rotating shaft into an input side shaft portion of a non-magnetic material and an output side shaft portion of a different material from that of the input side shaft portion, a part of the rotating shaft, i.e. output side shaft portion, can be formed of a relatively less expensive material in terms of price per unit weight than a material of the input side shaft portion as compared with a configuration in which the entire rotating shaft is formed of an expensive material that satisfies requirements of being non-magnetic and having high strength, such as stainless steel, and costs of the entire rotating shaft can therefore be reduced. Additionally, when a sensor (such as a magnetic sensor) for detecting the number of revolutions of the rotating shaft is located near an input side end of the rotating shaft, an adverse effect on the magnetic sensor can appropriately be avoided because the input side shaft portion is made of a non-magnetic material.

In addition, in the electromagnetic clutch according to the invention, since the output side shaft portion is engaged with the input side shaft portion in such a manner that the shaft portions cannot be rotated relative to each other (in other words, these are integrally rotatable), the output side shaft portion can always behave itself in harmony with rotation of the input side shaft portion, and as the entire rotating shaft, a reliable torque transmission capability from the input side to the output side can be secured.

Furthermore, although the electromagnetic clutch according to the invention includes a configuration in which the output side shaft portion is formed as a separate member from the rotor, the output side shaft portion may be integrally formed with the rotor. In this case, the rotor is rotated with rotation of the output side shaft portion in an integral manner, so that the torque can reliably be transmitted and simplification in the structure and reduction in the number of components can be achieved.

A configuration for integrally engaging the input side shaft portion with the output side shaft portion in a simplified structure includes one in which a connecting projection formed in one of the input side shaft portion and the output side shaft portion is press-fitted into a connecting recess formed in the other so that the two shaft portions are connected together in an integrally rotatable manner.

Advantageous Effects of Invention

According to the present invention, which adopts a novel idea of functionally dividing the rotating shaft into an input side and an output side and forming them as separate members, and fabricating the input side shaft portion and the output side shaft portion from heterogeneous materials for satisfying the respective requirements, it is possible to provide an electromagnetic clutch that enables cost reduction as compared with a conventional costly electromagnetic clutch with a rotating shaft of stainless steel, while being capable of reliably transmitting a torque.

BRIEF DESCRIPTION OF DRAWINGS

FIG. 1 is a schematic cross sectional view of an electromagnetic clutch (in an unexcited state) according to one embodiment of the invention.

DESCRIPTION OF EMBODIMENT

An embodiment of the present invention will now be described with reference to drawings. An electromagnetic clutch X according to the embodiment is applied, for example, to an opening/closing section of a back door of an automobile (not shown).

As shown in FIG. 1, the electromagnetic clutch X according to the embodiment includes a rotating shaft 1, a pole body 2 having an exciting coil 21, a rotor 3 secured to the rotating shaft 1 in an integrally rotatable manner, an armature 4 movable axially along the rotating shaft 1 in a direction in which the armature touches and releases the rotor 3, the armature being capable of forming a magnetic circuit along with the pole body 2 and the rotor 3, and a worm wheel 5 that is provided coaxially with the rotor 3 and can be rotated relative to the rotating shaft 1. In the embodiment, the rotor 3 serves as an output rotator and the worm wheel 5 as an input rotator.

The pole body 2 includes a ring-shaped yoke 22 and an exciting coil 21 wound around a bobbin 23 and housed within the yoke 22. The pole body 2 is also referred to as a field core. A power cord 24 (lead wire) is connected to the exciting coil 21 and an excitation current is supplied from an external power supply through the power cord 24.

The rotor 3 consists, for example, of a steel, and includes a disk section 31 that is perpendicular to the rotating shaft 1, and a cylindrical section 32 that extends in parallel to the rotating shaft 1 from a outer circumferential edge of the disk section 31 and can cover a part of the yoke 22 from a outer circumferential side.

The armature 4 is a ring-shaped magnetic whose main material (matrix material) is, for example, a steel (iron). The armature 4 cannot be moved (non-rotatable) in the radial direction of the rotating shaft 1, while the armature 4 can be slid in the axial direction (thrust direction) of the rotating shaft 1. In the embodiment, the armature 4 is attached to the worm wheel 5 that serves as an input rotator.

The worm wheel 5 is mounted so as to be rotatable relative to the rotating shaft 1, and axial movement thereof is restricted between the rotor 3 fixed to the rotating shaft 1 and a snap ring 6. A gear section 51 that meshes with a worm W of a driven device is formed on the outer circumference of the worm wheel 5. The worm wheel 5 also has protrusions 52 protruding toward the rotor 3 side formed at predetermined locations in the worm wheel 5. By engaging the protrusions 52 with positioning holes 41 formed in the armature 4, the armature 4 can be attached to the worm wheel 5 in such a manner that the armature 4 is axially slidable by a predetermined distance (to the extent that the engaged state with the protrusions 52 can be maintained) relative to the worm wheel 5 and is also non-rotatable. Note that a biasing member 7 (such as a wave washer) for biasing the armature 4 away from the rotor 3 is provided between the rotor 3 and the armature 4.

The rotating shaft 1 is rotatably supported by two bearings 8, 9. In the embodiment, one bearing 8 is secured to a predetermined device when the electromagnetic clutch X is mounted to the device, and the other bearing 9 is secured to the yoke 22 that contains the exciting coil 21 to form a magnetic path. In the electromagnetic clutch X according to the embodiment, the rotating shaft 1 is functionally divided into an input side shaft portion 11 and an output side shaft portion 12, and the input side shaft portion 11 and the output side shaft portion 12 are made of a material different from each other. Specifically, in the embodiment, the rotating shaft 1 is composed of the input side shaft portion 11 consisting of a material that is non-magnetic and has a sufficient strength for supporting rotation of the rotor 3 and the armature 4, and the output side shaft portion 12 that consists of a material different from that of the input side shaft portion 11 and is integrally rotatable with the input side shaft portion 11.

The input side shaft portion 11 is made of stainless steel, and has a connecting projection 11a formed thereon at an end on the side where the output side shaft portion 12 is connected (input shaft side connecting end) and the connecting projection 11a has a smaller diameter than other portions. Meanwhile, the output side shaft portion 12 is integrally formed with the rotor 3, and has a connecting recess 12a formed thereon at an end on the side where the input side shaft portion 11 is connected (output shaft side connecting end) and the connecting recess 12a is connectable with the connecting projection 11a of the input side shaft portion 11. This means that the output side shaft portion 12 consists of the same material as that of the rotor 3. In the embodiment, the connecting projection 11a of the input side shaft portion 11 is press-fitted into the connecting recess 12a of the output side shaft portion 12 so that the two rotating shaft elements (input side shaft portion 11 and output side shaft portion 12) are integrally and inseparably attached together in such a manner that the elements cannot be rotated relative to each other. Further in the embodiment, the connecting recess 12a is provided with a shape that is concaved by a predetermined size (a size corresponding to a protruding length of the connecting projection 11a) in a direction away from the armature 4 side across the friction surface 3a of the rotor 3. In this way, the output side shaft portion 12, which is of a magnetic material, is positioned in an area on the output side across the friction surface of the rotor 3. In other words, the output side shaft portion 12, which is of a magnetic material, is prevented from being positioned in an area on the input side across the friction surface of the rotor 3.

Description will now be made to the operation and effects of the electromagnetic clutch X having a configuration as described above.

When the exciting coil 21 is first supplied with a current and brought into an excited state, the armature 4 forms a magnetic circuit along with the pole body 2 and the rotor 3, and is attracted toward the rotor 3 side along the axial direction of the rotating shaft 1 up to a position where the armature 4 is brought into contact with the rotor 3 by an attraction force generated by the magnetic flux through the magnetic circuit against the biasing force of the biasing member 7. The armature 4 is then pressed against the rotor 3, whereby rotation of the worm wheel 5 is transmitted to the rotor 3 via the armature 4.

On the other hand, when the exciting coil 21 is in an unexcited state, in which the coil is not excited, the armature 4 that is not subjected to an electromagnetic force is biased by the biasing member 7 away from the rotor 3 and is held at a distance from the rotor 3 (see FIG. 1). As a result, rotation of the worm wheel 5 is not transmitted to the rotor 3.

In this way, the electromagnetic clutch X can be switched by supplying and blocking a current to the exciting coil 21 between a power transmission state, in which the armature 4 is subjected to an electromagnetic force so that the armature 4 is pressed against the rotor 3 to transmit a rotational force, and a blocked state, in which the armature 4 is forced at a distance from the rotor 3 to block the transmission of the rotational force.

In the electromagnetic clutch X according to the embodiment, the rotating shaft 1 is composed of the input side shaft portion 11 consisting of a material that is non-magnetic, and the output side shaft portion 12 that consists of a material different from that of the input side shaft portion 11 and is of a magnetic material that cannot be rotated relative to the input side shaft portion 11. Consequently, a less expensive material (such as a steel) than stainless steel that is a material for the input side shaft portion 11 can be used as a material for the output side shaft portion 12, which enables manufacturing costs of the rotating shaft 1 and therefore, manufacturing costs of the entire electromagnetic clutch X to be reduced as compared with the case where the entire rotating shaft is formed of a high-strength homogeneous non-magnetic material (such as stainless steel). Additionally, when the electromagnetic clutch X is used in a configuration in which a magnetic sensor (not shown) for detecting the number of revolutions of the rotating shaft 1 is located near the input side shaft portion 11, an adverse effect (occurrence of erroneous operation or detection) on the magnetic sensor due to leakage flux can be eliminated, because the input side shaft portion 11 is made of a non-magnetic material.

Furthermore, in the electromagnetic clutch X according to the embodiment, the output side shaft portion 12 is integrally formed with the rotor 3 so that rotation of the rotating shaft 1 is directly reflected to rotation of the rotor 3. In an excited state, therefore, a rotating torque of the rotating shaft 1 can reliably be transmitted from the rotor 3 to the worm wheel 5 via the armature 4. Additionally, since the output side shaft portion 12 is integrally formed with the rotor 3, reduction in the number of components and simplification in the structure can be achieved as compared with a configuration in which a separate output side shaft portion from the rotor is used.

Still further, in the electromagnetic clutch X according to the embodiment, the connecting projection 11a formed in the input side shaft portion 11 is press-fitted into the connecting recess 12a formed in the output side shaft portion 12 so that the two shaft portions (input side shaft portion 11 and output side shaft portion 12) are connected together in an integrally rotatable manner. It is therefore possible to provide the rotating shaft 1 in which relative rotation of two shaft portions (input side shaft portion 11 and output side shaft portion 12) is restricted with a simple structure and connection.

The present invention is not limited to the embodiment described above. For example, a connecting projection formed in the output side shaft portion may be press-fitted into a connecting recess formed in the input side shaft portion so that the two shaft portions are connected together in an integrally rotatable manner. Alternatively, a plurality of connecting projections may be formed in one of the input side shaft portion and the output side shaft portion and a plurality of connecting recesses may be formed in the other so that the two shaft portions are connected together in an integrally rotatable manner by press-fitting the connecting projections into the connecting recesses.

Alternatively, the input side shaft portion and the output side shaft portion may be connected together in an integrally rotatable manner by spline engagement. Furthermore, any suitable adhesive may be used to bond the input side shaft portion with the output side shaft portion as long as the requirement of restricting relative rotation of the two shaft portions is satisfied.

The proportion of the length (axial dimension) of the input side shaft portion or the output side shaft portion in the entire length of the rotating shaft may suitably be modified to the extent that an adverse effect on the sensor can be eliminated.

As the output side shaft portion, a separate one from the rotor may be used. In this case, the rotor may be attached to one of the input side shaft portion and the output side shaft portion in an integrally rotatable manner. The output side shaft portion is not limited to that of a magnetic material, and may be made of any material as long as it is different from that of the input side shaft portion. The output side shaft portion made of a material different from that of the rotor may also be used.

In the above-described embodiment, the input side shaft portion has been described in the case where it is made of stainless steel that has a relatively high strength and is relatively expensive in terms of price per unit weight. Besides stainless steel, however, a non-magnetic material having a relatively low strength or a relatively less expensive material may be selected as long as it has a sufficient strength for supporting rotation of the rotor and the armature; for example, biomass plastics or any other suitable synthetic resin may be used. The required strength for the input side shaft portion consisting of a non-magnetic material in the rotating shaft should be specified based on factors such as weight, size, the degree of eccentricity, the number of revolutions, inertia of rotation, and the engagement relationship with the output side shaft portion of the rotor and the armature, and depends on the electromagnetic clutch to be manufactured. The material, however, only needs to satisfy a minimum required torsional strength, tensile strength, and compression strength determined from the above factors.

Further, any specific configurations of other portions are not limited to the embodiment described above, and various modifications may be made within the true spirit of the invention.

The invention claimed is:

1. An electromagnetic clutch, comprising:
   a rotating shaft;
   a pole body having an exciting coil;
   a rotor located at a position facing the pole body along an axial direction of the rotating shaft; and
   an armature movable in the axial direction of the rotating shaft in a direction in which the armature alternately touches and releases the rotor, the armature being capable of forming a magnetic circuit along with the pole body and the rotor,
   wherein when the exciting coil is in an excited state, the armature is moved in the axial direction of the rotating shaft by an electromagnetic attraction force so as to be pressed against a friction surface of the rotor, and
   the rotating shaft comprises: an input side shaft portion at an input side and an output side shaft portion at an output side; the input side shaft portion consisting of a non-magnetic material having a sufficient strength for supporting rotation of the armature and the rotor; and the output side shaft portion consisting of a magnetic material engaged with the input side shaft portion in such a manner that the output side shaft portion cannot be rotated relative to the input side shaft portion,
   wherein the output side shaft portion is not extended to the input side across the friction surface of the rotor.

2. The electromagnetic clutch according to claim 1, wherein the output side shaft portion is integrally formed with the rotor.

3. The electromagnetic clutch according to claim 2, wherein a connecting projection formed in one of the input side shaft portion and the output side shaft portion is press-fitted into a connecting recess formed in the other so that the two shaft portions are connected together in such a manner that the shaft portions cannot be rotated relative to each other.

4. The electromagnetic clutch according to claim 1, wherein a connecting projection formed in one of the input side shaft portion and the output side shaft portion is press-fitted into a connecting recess formed in the other so that the two shaft portions are connected together in such a manner that the shaft portions cannot be rotated relative to each other.

* * * * *